United States Patent [19]

Zimmermann

[11] 3,807,650

[45] Apr. 30, 1974

[54] COAXIAL MOUNTING ARRANGEMENT FOR TAPE SPOOL AND DRIVE MOTOR

[75] Inventor: Joseph James Zimmermann, Elm Grove, Wis.

[73] Assignee: GTE Automatic Electric Laboratories Incorporated, Northlake, Ill.

[22] Filed: Oct. 27, 1972

[21] Appl. No.: 301,549

[52] U.S. Cl. .......................... 242/55.19 R, 242/68.3

[51] Int. Cl. .......................... B65h 17/48

[58] Field of Search..... 242/55.19 A, 55.19 R, 68.3, 242/179, 84.1 A; 179/100.2 Z, 100.2 R

[56] References Cited

UNITED STATES PATENTS 3,606,184 9/1971 Fencel .......................... 242/55.19 R 3,246,859 4/1966 Martin .......................... 242/84.1 A X

*Primary Examiner*—Billy S. Taylor

*Attorney, Agent, or Firm*—Lester N. Arnold

[57] ABSTRACT

The motor casing for a drive motor of a tape recorder unit is utilized to provide a fixed mounting hub for the rotating action of an annular tape spool in a novel space-saving mounting arrangement for the tape spool where heretofore the tape spool has been mounted on a rotatable hub removed from the location of the drive motor. An anti-frictional bushing is used to interface between the tape spool and the motor casing in order to provide a reduction of friction therebetween.

5 Claims, 2 Drawing Figures

COAXIAL MOUNTING ARRANGEMENT FOR TAPE SPOOL AND DRIVE MOTOR

BACKGROUND OF THE INVENTION

This invention relates generally to tape type recording and playback mechanisms such as magnetic tape recorders, and more particularly, relates to a unique space-saving mounting arrangement for the drive motor and the tape spool of the tape recording mechanism.

Heretofore it has been the practice to provide a free rotating hub within the tape recorder on which to mount a tape spool and to fix the position of the rotating hub internal to the tape recorder at a location removed from the drive motor. In order to drive the magnetic tape past the recording heads, a pulley and belt assembly connects the rotating shaft of the drive motor to a capstan. The tape is captured between the rotating capstan and a pinch roller whereby the rotating capstan imparts movement to the tape. It is a continuing design objective to reduce the overall size and weight of such tape recording equipments through such avenues as miniaturization of components, redesign of components and their mounting arrangements, elimination of non-critical and non-essential components, etc. To this end, it is hereby proposed to eliminate the separate rotatable mounting hub for the tape spool and to provide instead a fixed mounting hub upon which the tape spool can be rotatably mounted, the housing for the drive motor conveniently serving as such a fixed mounting hub.

SUMMARY OF THE INVENTION

It is therefore an object of the present invention to provide a tape spool mounting arrangement whereby a considerable space-saving is realized through an elimination of a separate rotatable mounting hub for the tape spool. It is another object of the invention to utilize a portion of the outer housing of the drive motor as a fixed mounting hub on which the tape spool is to be rotatably mounted.

A tape spool mounting arrangement for a tape type recording and playback mechanism includes a drive motor, an annular tape spool, recording and playback reproducing means, and means for guiding and moving said tape with respect to said recording and playback reproducing means. An elongated stationary housing body for the drive motor has its longitudinal axis aligned in the vertical direction with respect to a deck plate on which internal components are mounted. One end portion of the housing body includes a generally circular cross-section on which the annular tape cartridge spool is rotatably mounted through insertedly receiving the one end portion of circular cross-section through the central opening of the tape spool. The tape spool is preferably aligned in a horizontal plane with respect to the motor housing body for facilitating feed and take-up movements of the tape with respect to the tape spool. Bushing interface means is secured to the one end portion of the motor housing body and is interpositioned between the motor housing body and the rotating tape spool for reducing the friction therebetween.

DETAILED DESCRIPTION

Figure 1:
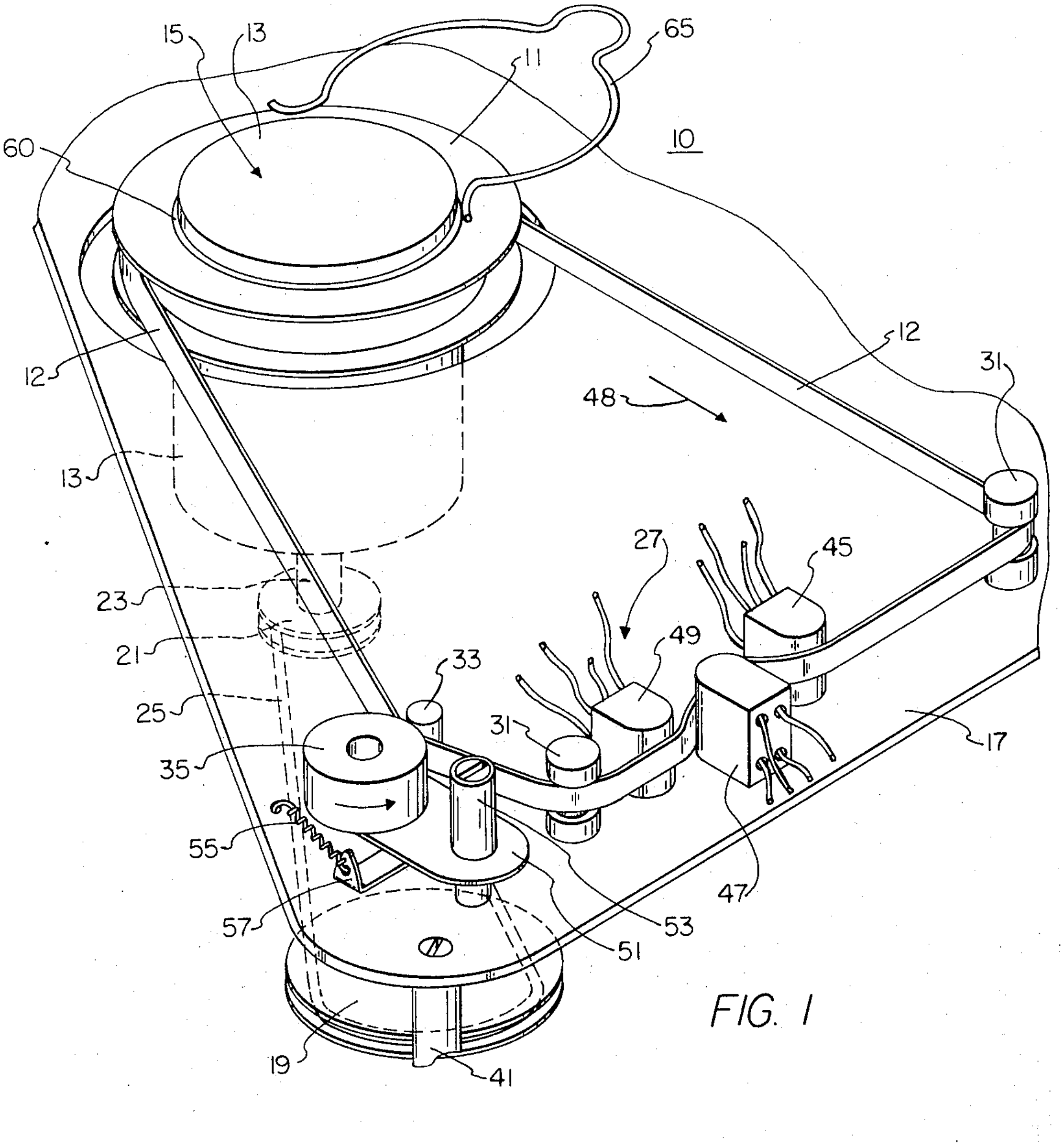
FIG. 1 shows a front perspective view of a novel mounting arrangement for a tape spool and a motor housing body in accordance with the principles of the present invention.

FIG. 1 shows those internal instrumentalities of a standard magnetic tape recorder 10 which are used to illustrate the present invention. Accordingly, there is shown an annular tape spool 11 containing thereon an endless loop tape 12, an outer casing or housing body 13 for a drive motor 15, a deck plate 17, a flywheel 19 connected to a drive pulley 21 on a rotating motor shaft 23 by a belt 25, recording and playback reproducing means 27 and means such as guide posts 31, a rotatable capstan 33, and a pinch roller 35 for guiding and moving said tape with respect to the recording and playback reproducing means 27. Typically, the deck plate 17 serves as a mounting plate for a plurality of internal components and lies in a horizontal plane in the usual operational orientation of the tape recorder 10. Suitable mounting posts such as the mounting post 41 are used to position the deck plate 17 within the outer casing (not shown) for the tape recorder 10, the deck plate 17 serving to define upper and lower compartments within the tape recorder 10 within which to mount the plurality of required internal instrumentalities including accompanying mechanical and electric controls, wiring and parts (most of which are not shown in the drawing).

The drive motor 15 is preferably a direct-current 6 volt electrical motor the internal construction of which is not pertinent to the present invention except insofar as the construction pertains to electrical shielding. Because of the mounting arrangement which is to be disclosed in detail hereinafter, it is required that an electrical motor be employed having relatively low or weak electrical field strength in the area immediately adjacent to the exterior surface of the motor casing 13. Preferably, an electrical motor having a relatively low torque output and having a double internal electrical fielding shield is provided as the drive motor 15. Such electrical motors normally have outer casings configured as elongated cylinders and usual drive motor mounting arrangements within the tape recorder 10 have the elongated axis of the motor shaft 23 aligned in a vertical direction. In order to reduce the height of the tape recorder 10 to substantially that of the elongated dimension of the motor casing 13, an opening 43 is provided in the deck plate 17 to permit the upper end portion of the motor casing 13 to extend into the upper compartment of the tape recorder 10. It is to be understood that while the outer casing 13 of the drive motor 15 is of generally circular cross-section throughout its length dimension, it is only required for the purposes of the present invention that the upper end portion of the casing 13 be of circular cross-section to attain the novel mounting arrangement of the present invention.

The tape recorder 10 typically includes the recording and playback reproducing means 27 in the form of an erase head 45, a record head 47 and a playback reproducing head 49 having the tape moving thereacross in the direction of the arrow 48 in a conventional and well understood manner. A pair of guide posts 31 are provided to guide the tape 12 as it moves into and from the magnetic heads. The pinch roller 35 is mounted to a base plate 51 which is then pivotally mounted to a pivot post 53 attached to the deck plate 17. A suitable compression spring 55 is attached to the deck plate 17 and to a member 57 fixed to the base plate 51 for the purpose of imparting a clockwise CW bias to the pinch roller 35 to provide a firm engagement with the tape 12 and capstan 33. The capstan 33 is the drive mechanism for the tape 12 which feeds from the inner-most convolutions of the wrapped tape and has its take-up on the outer-most convolution. The capstan 33 is connected directly to the axis of the flywheel 19 which, of course, is driven by the rotating drive pulley 21 through the interconnecting closed loop belt 25.

Figure 2:
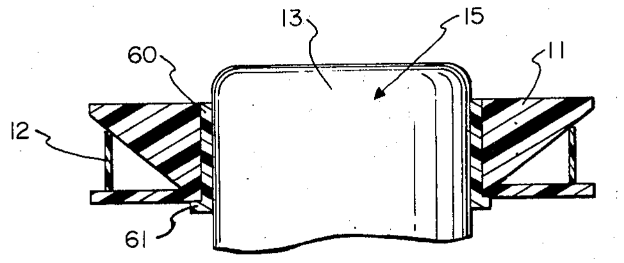
FIG. 2 is a partial cross-sectional view generally taken along the line 2—2 of FIG. 1.

Now in accordance with the present invention, a novel space-saving mounting arrangement is provided for the tape cartridge spool 11 whereby the upper end portion of the motor casing 13 is utilized as a fixed mounting hub for the rotatably tape spool 11. Accordingly, the central opening of the tape spool 11 is used to receive therethrough the upper end portion of the motor casing 13 as shown clearly in FIGS. 1 and 2. In order to substantially eliminate any friction between the rotating tape spool 11 and the motor casing 13, there is provided a suitable bushing member 60 used as a mechanical interface or adapter between the two parts. Preferably, the bushing member 60 includes a lower protruding shoulder portion 61, FIG. 2, which serves as a rest for the rotating tape spool 11. The bushing member 60 is to be constructed of a material having sufficient lubricity such as lubricate impregnated phenolics and which do not experience swelling with high humidity conditions such as does nylon. The bushing member 60 can be attached to the motor casing 13 by conventional fasteners or adhesives and has been found to partially correct any non-circular cross-section of the motor casing which is not normally manufactured to a tolerance calculated to give a uniform circular cross-section. Although not shown in the drawing, if the relative diameters of the tape spool 11 and motor casing 13 are such that there is presented a large interspace therebetween, an adapter ring could be provided either having the bushing member 60 positioned between the adapter ring and the motor casing 13 or between the adapter ring and the tape spool 11 in which case the adapter ring would be a non-rotatable member.

It is desirable to provide an orientation of the tape spool 11 within a horizontal plane at least with the tape recorder 10 being operated so as to facilitate the feed and take-up movements of the tape 12 with respect to the capstan 33, guide posts 31, and the magnetic heads 45, 47 and 49. This orientation is shown achieved in FIG. 2 primarily by the lower surface of the tape spool resting upon the shoulder portion 61 of the bushing member 60 which is so oriented. The force of gravity on the mass of the tape spool 11 has been sufficient to retain the tape spool 11 on the motor casing 13 without the tendency of the rotating tape spool to climb the motor casing 13 or to wobble while rotating. However, in the transport of the tape recorder 10, the tape spool 11 could be conceivably dislodged from its mounting if the tape recorder 10 was turned upside-down or on its side. Therefore, a suitable wire retaining member is shown at 65 in FIG. 1 which is useful to snap onto the top portion of the motor casing 13 and retain the tape spool 11 in place. Of course, a variety of compatible configurations for such a retaining member could be utilized as well.

It is to be understood that while the present invention has been shown and described with reference to the preferred embodiment thereof, the invention is not be be limited to the precise form set forth, and that various modifications and changes may be made by those skilled in the art without departing from the spirit and scope thereof.

What is claimed is:

1. A tape spool mounting arrangement for a tape type recording and playback mechanism having a drive motor, an annular tape spool, recording and playback reproducing means, and means for guiding and moving said tape with respect to said recording and playback reproducing means, said mounting arrangement comprising an elongated stationary housing body for said drive motor having its longitudinal axis aligned in a vertical direction and having a generally circular cross-section on at least one end portion thereof, said annular tape spool rotatably mounted on said motor housing body through receiving said one end portion of circular cross-section through the central opening of said spool, said spool being aligned in a horizontal plane with respect to said motor housing body for facilitating feed and take-up movements of said tape with said spool, and bushing interface means secured to said one end portion of said motor housing body and interpositioned between said motor housing body and said rotating tape cartridge spool for reducing friction therebetween.

2. The mounting arrangement of claim 1 wherein said bushing member includes an outer protruding shoulder portion which supportedly engages the lower interior edge portion of said annular tape spool.

3. The mounting arrangement of claim 1 wherein said bushing member is comprised of a lubricate impregnated phenolic material substantially impervious to a high humidity environment.

4. The mounting arrangement of claim 3 wherein a retaining member is secured to said one end portion of said motor housing body immediately above the upper surface of said tape spool for retaining said tape spool in position with respect to said bushing member.

5. The mounting arrangement of claim 1 wherein the central axis of said tape spool and the drive shaft of said drive motor are coaxially aligned.

* * * * *